US010414917B2

(12) United States Patent
Hagen et al.

(10) Patent No.: US 10,414,917 B2
(45) Date of Patent: Sep. 17, 2019

(54) PROCESS AND APPARATUS FOR PREPARATION OF A CRYSTALLIZABLE POLYLACTIC ACID MIXTURE, AND POLYLACTIC ACID MIXTURE

(71) Applicants: Uhde Inventa-Fischer GmbH, Berlin (DE); ThyssenKrupp AG, Essen (DE)

(72) Inventors: Rainer Hagen, Berlin (DE); Udo Mühlbauer, Berlin (DE); Caspar Paetz, Berlin (DE)

(73) Assignees: UHDE INVENTA-FISCHER GMBH, Berlin (DE); THYSSENKRUPP AG, Essen (DE)

( * ) Notice: Subject to any disclaimer, the term of this patent is extended or adjusted under 35 U.S.C. 154(b) by 12 days.

(21) Appl. No.: 15/037,277

(22) PCT Filed: Oct. 24, 2014

(86) PCT No.: PCT/EP2014/072832
§ 371 (c)(1),
(2) Date: May 17, 2016

(87) PCT Pub. No.: WO2015/074827
PCT Pub. Date: May 28, 2015

(65) Prior Publication Data
US 2016/0280908 A1    Sep. 29, 2016

(30) Foreign Application Priority Data

Nov. 20, 2013 (EP) .................... 13193671

(51) Int. Cl.
C08L 67/04    (2006.01)
C08G 63/08    (2006.01)
C08G 63/78    (2006.01)
B01J 19/24    (2006.01)

(52) U.S. Cl.
CPC .......... *C08L 67/04* (2013.01); *B01J 19/2445* (2013.01); *C08G 63/08* (2013.01); *C08G 63/78* (2013.01); *C08G 63/785* (2013.01); *B01J 2219/00006* (2013.01); *C08L 2205/025* (2013.01)

(58) Field of Classification Search
CPC . C08L 67/04; C08L 2205/025; B01J 19/2445; C08G 63/08; C08G 63/785; C08G 63/78
See application file for complete search history.

(56) References Cited

U.S. PATENT DOCUMENTS 5,558,678 A    9/1996  Weger
6,368,346 B1 *  4/2002  Jadhav .................... A61L 31/06
                                                    264/210.8

FOREIGN PATENT DOCUMENTS

| EP | 1577346 A1 | 9/2005 |
| EP | 2058351 A1 | 5/2009 |
| EP | 2161263 A1 | 3/2010 |
| EP | 2607399 A1 | 6/2013 |
| WO | 8810260 A1 | 12/1988 |
| WO | 9315127 A1 | 8/1993 |
| WO | 2005030395 A1 | 4/2005 |
| WO | 2009030395 A1 | 3/2009 |
| WO | 2009030397 A1 | 3/2009 |
| WO | 2009039397 A1 | 3/2009 |
| WO | 2013039266 A1 | 3/2013 |

OTHER PUBLICATIONS

Pan, P., et al.; Macromolecules, 2009, vol. 24, p. 3374-3380.*
Groot, W., et al.; Poly(Lactic Acid): Synthesis, Structures, Properties, Processing, and Applications, 2010, p. 3-65.*
Boupao, L., et al.; Polymer, 2009, vol. 50, p. 4007-4017.*
Simon, C.G., et al.; Biomaterials, 2005, vol. 26, p. 6906-6915.*
M. Pyda et al., J. Chem. Thermodynamics 36 (2004) 731.
Dorgan et al., J. Polym. Sci.: Part B: Polym. Physics, vol. 43, 3100-3111 (2005).
International Search Report for PCT/EP2014/072832 dated Feb. 3, 2015 (dated Feb. 13, 2015).
English Language Abstract for WO8810260.
English Language Abstract for WO2009030395.
English Language Abstract for WO2009039397.
English Language Abstract for WO2009030397.
English Language Abstract for WO2005030395.
English Language Abstract for EP2161263.

* cited by examiner

Primary Examiner — Robert S Jones
(74) Attorney, Agent, or Firm — Leydig, Voit & Mayer, Ltd.

(57) ABSTRACT

In a practicable continuous or batchwise process for the preparation of a crystallizable polylactic acid mixture, lactic acid may be polycondensed to yield an oligomer, which may then be depolymerized to yield a crude lactide. The crude lactide may be purified to yield a pure lactide, wherein fractionation may be carried out in the purification into an L- or D-lactide-rich fraction and also a meso-lactide-rich fraction. Subsequently a separate ring-opening polymerization of the resulting lactide fractions can be carried out. The individual polylactic acid batches or streams generated by the ring-opening polymerization may then be mixed. The present disclosure further relates to apparatuses for carrying out such processes and polylactic acid mixtures.

11 Claims, 6 Drawing Sheets

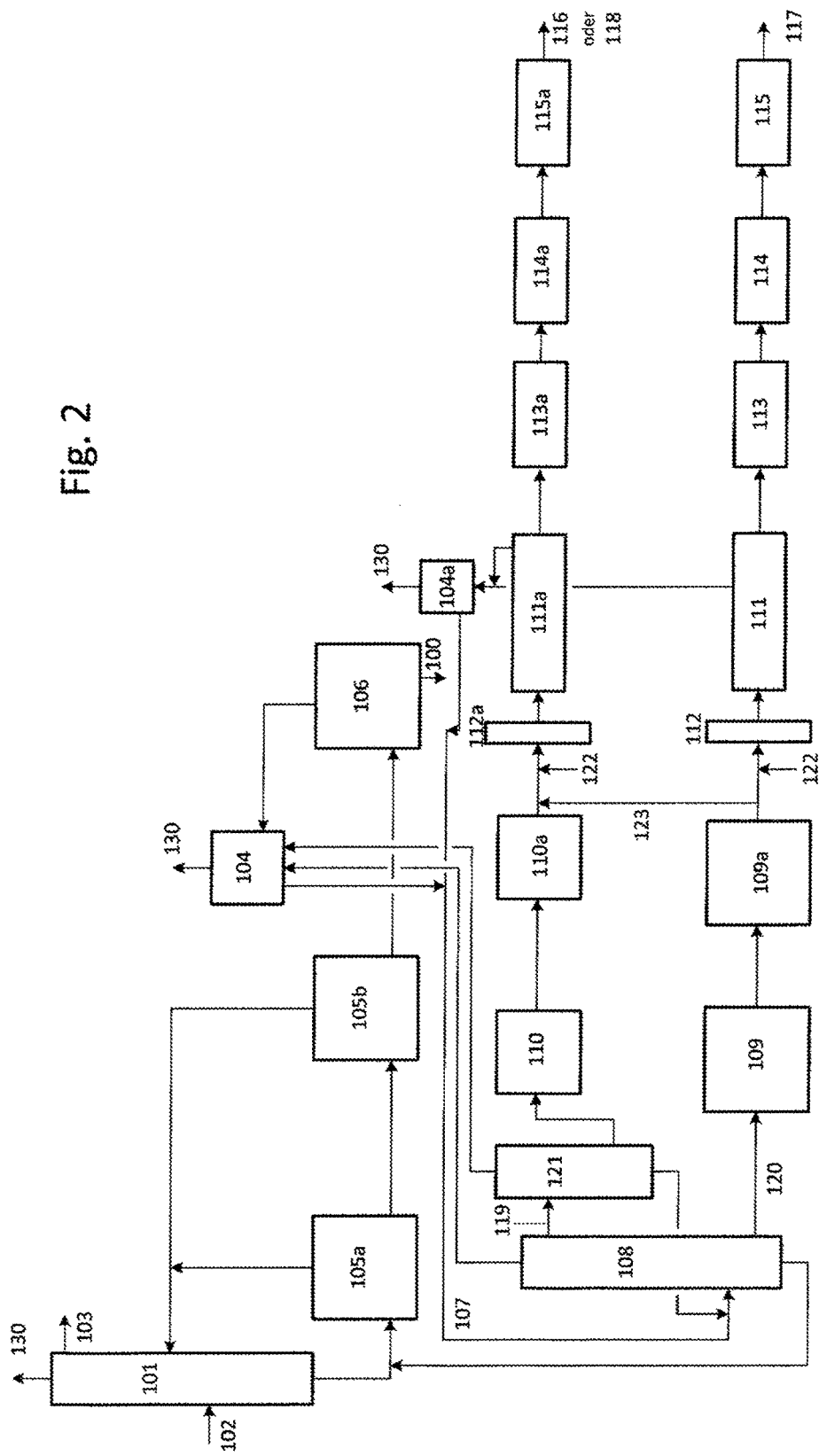

PROCESS AND APPARATUS FOR PREPARATION OF A CRYSTALLIZABLE POLYLACTIC ACID MIXTURE, AND POLYLACTIC ACID MIXTURE

CROSS REFERENCE TO RELATED APPLICATIONS

This application is a U.S. National Stage Entry of International Patent Application Serial Number PCT/EP2014/072832, filed Oct. 24, 2014, which claims priority to European Patent Application No. EP 13193671.8 filed Nov. 20, 2013, the entire contents of both of which are incorporated herein by reference.

FIELD

The present disclosure relates to polylactic acid mixtures and, more particularly, to apparatuses and processes for producing polylactic acid mixtures.

BACKGROUND

In large-scale production processes for preparing polylactic acid (PLA), meso-lactide-containing by-products are frequently converted back into lactic acid by hydrolysis with water and are used for other purposes than for the preparation of PLA. Examples of such uses are the preparation of lactic acid esters for solvents and the preparation of alkali metal and alkaline earth metal salts of lactic acid for feedstuffs and preservatives.

For a PLA process, these uses represent a loss of yield. The uses mentioned have a lower value in most cases compared to PLA. These products are also accessible from cheaper quality lactic acid to which considerably lower requirements are applied in terms of purity than to lactic acid for the preparation of PLA. In addition, this procedure requires additional effort in terms of handling, packaging and transport.

Considered from a technical and economic standpoint, it is therefore desirable to convert also the meso-lactide-containing by-product into a technically usable PLA and thus to avoid losses.

Processes have been known which polymerize the meso-lactide to poly-DL-lactic acid (PDLLA).

Amorphous, i.e. non-crystallizable types of PLA are formed in this case which already convert into a melt at the glass transition point. This point depends somewhat on the D-lactide content of the meso-lactide used for the polymerization, which is however below 60° C. and therefore considerably lower than the melting point of semicrystalline types of PLA, which is at 135 to 180° C. The stability of amorphous types of PDLLA to hydrolysis is low, and their mechanical properties such as strength, modulus of elasticity and impact resistance are significantly lower compared to crystallizable types of poly-L-lactic acid (PLLA) having a proportion of of D-lactic acid units in the polymer chain of 0-6%. They are mostly speciality products for a very limited field of application and accordingly with low demand for quantity, for example, in medicine.

It follows that meso-lactide or a lactide mixture having relatively high proportions of meso-lactide must undergo a more costly purification than L-lactide. Only low molar mass is otherwise attained in the polymerization and yellow to brown discoloration therefore occurs in an undesired manner. Processes for polymerization of meso-lactide or meso-lactide-rich mixtures have therefore never been described as a means of improving the total yield in a large-scale production process for preparing PLA.

A poly-meso-lactide is known from WO 88/10260 (Böhringer Ingelheim) and also copolymers comprising meso-lactide units. A particularly pure meso-lactide having a melting point above 48° C. is used for the polymerization, which is prepared by rectification of a mixture of meso-lactide and D,L-lactide. In this case, D,L-lactide refers to a mixture of D- and L-lactide in a 1:1 ratio. This document contains no information on mixing this polymer with PLLA or poly-D-lactic acid nor on the properties of such a mixture.

EP 1 577 346 A1 (Mitsubishi Plastics Inc.) describes a mixture of a largely amorphous PLA and a crystalline PLA, wherein the mixing ratio is 10 to 200 parts by mass of crystalline PLA per 100 parts by mass of the amorphous PLA (corresponds to a proportion of amorphous PLA of 33.3% to 90.9%). The ratio of L-lactic acid units to D-lactic acid units in the amorphous PLA is in this case between 92:8 and 8:92 (D-proportion between 8 and 92%) and in the crystalline PLA not less than 94:6 (94% L) and not more than 6:94 (6% L).

BRIEF DESCRIPTION OF THE FIGURES

FIG. 2 is a schematic view of still another example process for preparing a crystallizable polylactic acid mixture from lactic acid.

DETAILED DESCRIPTION

Figure 1:
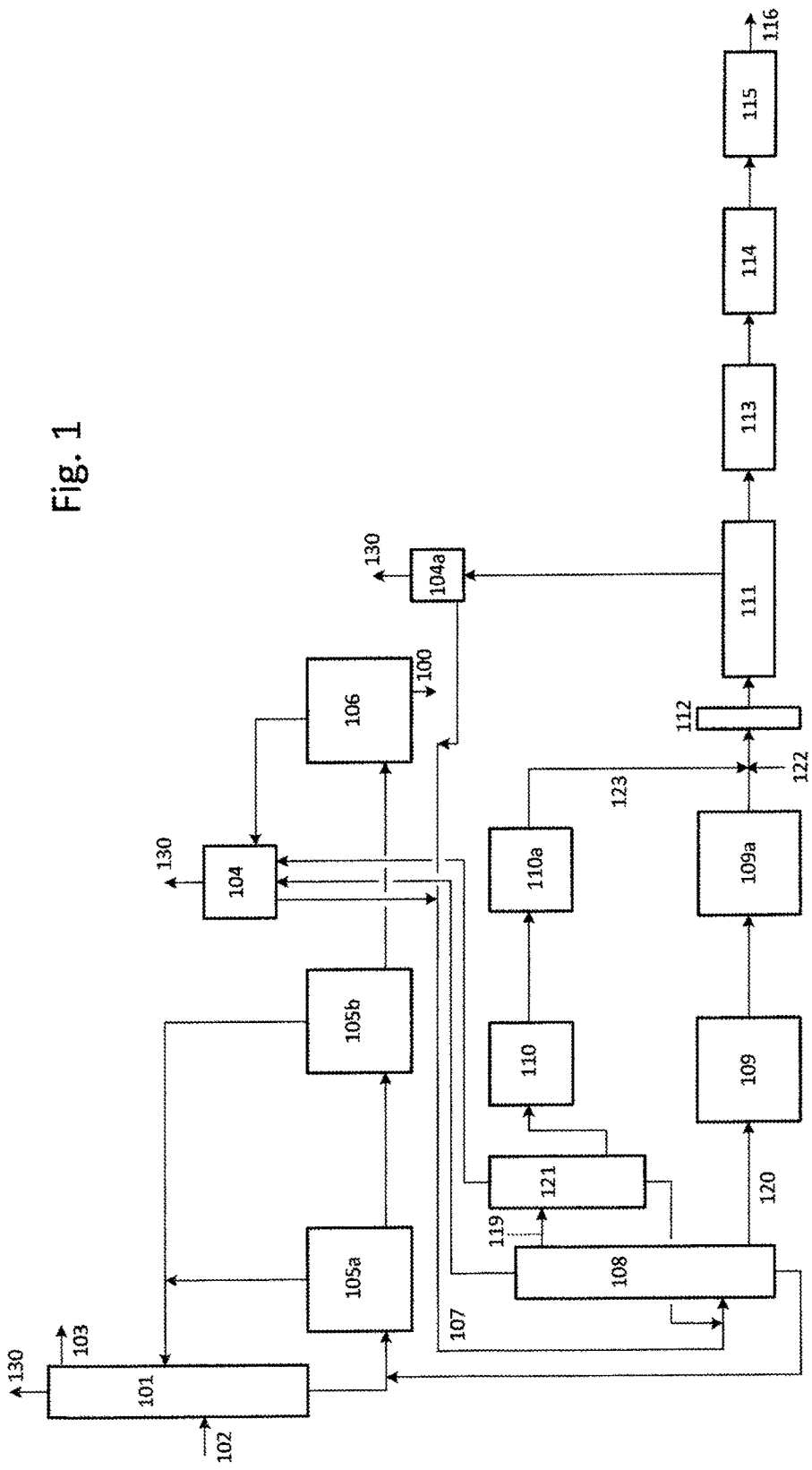
FIG. 1 is a schematic view of an example process for preparing a crystallizable polylactic acid mixture from lactic acid.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

On this basis, one example object of the present disclosure is to provide a PLA mixture which shows good moldability in the thermoforming process and thus retains sufficient impact resistance and thermal stability. The mixture shows the high impact resistance and thermal stability of crystalline PLA. Amorphous PLA renders the mixture flexible and thus improves the moldability during a thermoforming process.

In addition, another example object of the present disclosure is to provide a process which converts the raw material lactic acid virtually completely into marketable PLA.

It is still another example object of the present disclosure to provide a PLA, which can incorporate the byproducts of meso-lactide and D-lactide produced from L-lactic acid in the preparation process, which remains crystallizable and which retains the properties important for the technical application.

The invention relates therefore to a process for preparing a crystallizable polylactic acid mixture (PLA), in which
  a) lactic acid is polycondensed to give an oligomer,
  b) the oligomer is depolymerized to give a crude lactide,
  c) the crude lactide is purified to give a pure lactide, wherein a simultaneous separation is carried out into an L-lactide-rich fraction having a content of at most 6% by weight D-lactic acid units and a meso-lactide-rich fraction having a content of at least 15% by weight meso-lactide or into a D-lactide-rich fraction having a content of at most 6% by weight L-lactic acid units and a meso-lactide-rich fraction having a content of at least 15% by weight meso-lactide,
  d) a separate ring-opening polymerization is carried out of the meso-lactide-rich fraction to give a meso-lactide-rich polylactic acid molding composition (PDLLA) and of the L-lactide-rich or of the D-lactide-rich fraction to give an L-lactide-rich polylactic acid molding composition (PLLA) or to give a D-lactide-rich polylactic acid molding composition (PDLA) respectively, and
  e) generation of the polylactic acid mixture (PLA) by mixing at least a portion of the meso-lactide-rich polylactic acid molding composition (PDLLA) and at least a portion of the L-lactide-rich polylactic acid molding composition (PLLA) or at least a portion of the D-lactide-rich polylactic acid molding composition (PDLA).

Put another way, the present disclosure generally concerns practicable continuous or batchwise processes for the preparation of a crystallizable polylactic acid mixture starting from lactic acid. The lactic acid may be polycondensed to give an oligomer, and the oligomer may be depolymerized to give a crude lactide. The crude lactide can be purified to give a pure lactide, wherein a fractionation may be carried out in the purification into an L- or D-lactide-rich fraction and also a meso-lactide-rich fraction and subsequently a separate ring-opening polymerization of the resulting lactide fractions may be carried out. Thereafter, the individual polylactic acid batches or streams generated by the ring-opening polymerization may be mixed. Excellent yields are obtained with the process according to the present disclosure, based at least in part on the lactic acid used. The present disclosure further relates to an apparatus for carrying out the processes disclosed herein, and also polylactic acid mixtures.

The particular advantage of the process according to the invention is that the molar yield of the crystallizable polylactic acid mixture is very high and in particular at least 95%, based on the lactic acid used. By means of the integrated process regime described above in which, starting from lactic acid, a finished polylactic acid mixture is obtained, an exceptionally economical process regime can thus be ensured.

The process regime according to the invention comprises two variants. According to a first variant, described in step c) above, a separation into an L-lactide-rich fraction and a meso-lactide-rich fraction is carried out. As an alternative, it is likewise possible to enable a separation into a D-lactide-rich fraction and a meso-lactide-rich fraction. Lactic acid having a high proportion of L-lactic acid units is used advantageously for the first variant, whereas for the second variant, lactic acid having a high proportion of D-lactic acid units is advantageously used.

The individual process steps applied in the process are already known separately from the prior art. With respect to technical details for the individual reaction stages, both patent application WO 2009/030395 A1 and WO 2009/039397 A1 are referred to in this regard, whose disclosure content is also made the subject matter of the present patent application.

In the case that the meso-lactide-rich polylactic acid molding composition (PDLLA) and the L-lactide-rich polylactic acid molding composition (PLLA) are mixed, it is advantageous if the average content of D-lactic acid units in the resulting polylactic acid mixture (PLA) is between 6 and 30% by weight, preferably between 6 and 20% by weight.

In the case that the meso-lactide-rich polylactic acid molding composition (PDLLA) and the D-lactide-rich polylactic acid molding composition (PDLA) are mixed, it is advantageous if the average content of L-lactic acid units in the resulting polylactic acid mixture (PLA) is between 6 and 30% by weight, preferably between 6 and 20% by weight.

The average content of L- or D-lactic acid units can be specifically adjusted by the content of the respective L- or D-lactic acid units of the particular PDLLA with the PLLA or PDLA and also the ratios of the two molding compositions.

It is further advantageous if the lactide-rich fraction is purified to a content of lactic acid units of 0 to 6% by weight. In this case, preference is given to starting from essentially isomerically pure L-lactic acid. This allows the preparation of an L-lactide-rich polylactide molding composition (PLLA) having a content of D-lactic acid units of 0 to 6% by weight.

In the case that, in step c) described above, a separation is carried out into a D-lactide-rich and a meso-lactide-rich fraction, it is likewise advantageous if the D-lactide-rich fraction has a content of 0 to 6% by weight L-lactic acid units and/or the D-lactide-rich polylactide molding composition (PDLA) generated therefrom has a content of 0-6% by weight of L-lactic acid units.

In each case, it is advantageous that the resulting meso-lactide-rich fraction is purified to a content of 15 to 100% by weight, preferably 50 to 100% by weight meso-lactide and/or the meso-lactide-rich polylactic acid molding composition (PDLLA) generated therefrom has a content of meso-lactide units of 15 to 100% by weight, preferably 50 to 100% by weight.

In addition to or as an alternative to the embodiments described above, it is further advantageous if in the case of generating an L-lactide-rich fraction, this is purified to a content 94 to 100% by weight of L-lactic acid units of and/or the L-lactide-rich polylactide molding composition (PLLA) generated therefrom has a content of 94 to 100% by weight of L-lactic acid units.

In the case that a D-lactide-rich fraction is generated in the purification step or separation step, it is preferred that this is purified to a content of 94 to 100% by weight D-lactic acid units and/or the D-lactide-rich polylactide molding composition (PLLA) generated therefrom has a content of 94 to 100% by weight of D-lactic acid units.

For generating the polylactic acid mixture (PLA) in step e), it is advantageous if 1 to 50 parts by weight, preferably 1 to 30 parts by weight of the meso-lactide-rich polylactic acid molding composition (PDLLA) and 99 to 50 parts by weight, preferably 99 to 70 parts by weight of the L-lactide-rich polylactic acid molding composition (PLLA) or 99 to 50 parts by weight, preferably 99 to 70 parts by weight of the D-lactide-rich polylactic acid molding composition (PDLA) are mixed.

Advantageously, in purification step c),
  a) the meso-lactide-rich fraction is purified to a carboxyl group content of at most 20 mmol/kg, preferably at most 10 mmol/kg, preferably at most 5 mmol/kg, particularly preferably at most 3 mmol/kg and/or
b) the L-lactide-rich fraction or the D-lactide-rich fraction is purified to a carboxyl group content of at most 10 mmol/kg, preferably at most 5 mmol/kg.

In a further preferred embodiment, in the ring-opening polymerization
a) of the meso-lactide-rich fraction, a meso-lactide-rich polylactic acid molding composition (PDLLA) is generated having an intrinsic viscosity of 0.80 to 1.80 and/or
b) of the L-lactide-rich or of the D-lactide-rich fraction, an L-lactide-rich polylactic acid molding composition (PLLA) or a D-lactide-rich polylactic acid molding composition (PDLA) is generated having an intrinsic viscosity of 1.0 to 2.0.

Before, during and/or after the mixing of the meso-lactide-rich polylactic acid molding composition (PDLLA) and the L-lactide-rich polylactic acid molding composition (PLLA) or the D-lactide-rich polylactic acid molding composition (PDLA)
a) stabilizers and/or additives may be added, and/or
b) a demonomerization,
c) cooling and/or granulation and/or
d) crystallization, drying and cooling are carried out in a tower dryer having a stirred crystallization zone, drying zone and tube bundle condenser.

The lactic acid used in step a) preferably has an isomeric purity of at least 95%, more preferably at least 99%. Isomeric purity is understood to mean here, based on all possible optical isomers of lactic acid, i.e. L- or D-lactic acid, that the percentage specified is the proportion by weight of the respective isomer, based on the totality of the isomers. According to this preferred embodiment, therefore, either L-lactic acid with an isomeric purity defined above is used or D-lactic acid with an isomeric purity defined above is used.

It is further preferred that at least a portion of the meso-lactide-rich polylactic acid molding composition (PDLLA) and at least a portion of the L-lactide-rich polylactic acid molding composition (PLLA) or the D-lactide-rich polylactic acid molding composition (PDLA), directly after the separate preparation thereof by means of ring-opening polymerization, are at least
a) stabilized and mixed together in the molten state, or
b) separately stabilized and demonomerized and subsequently mixed in the molten state, and/or
c) separately granulated and mixed to give a granulate mixture.

The mixture generated can be further processed directly or the granulate mixture is further processed directly or separately, in particular to give moldings such as fibers, films or shaped articles.

The present invention also relates to an apparatus for preparing a polylactic acid mixture. The apparatus according to the invention comprises
a) at least one polycondensation reactor for generating oligomers of lactic acid by polycondensation,
b) at least one apparatus, downstream of the at least one polycondensation reactor, for generating crude lactide by depolymerization of the lactic acid oligomers,
c) at least one apparatus, downstream of the at least one apparatus for generating crude lactide, for purifying the crude lactide to give a pure lactide, which enables separation of the crude lactide into an L-lactide-rich fraction having a content of at most 6% by weight D-lactic acid units and a meso-lactide-rich fraction having at least 15% by weight meso-lactide or into a D-lactide-rich fraction having at most 6% by weight L-lactic acid units and a meso-lactide-rich fraction having at least 15% by weight meso-lactide,
d) at least two separate polymerization reactors, downstream of the at least one apparatus for purifying the crude lactide, wherein in at least one first polymerization reactor, a ring-opening polymerization of the L-lactide-rich or D-lactide-rich fraction is carried out to give an L-lactide-rich polylactic acid molding composition (PLLA) or to give a D-lactide-rich polylactic acid molding composition (PDLA) and in at least one second polymerization reactor, a ring-opening polymerization of the meso-lactide-rich fraction is carried out to give a meso-lactide-rich polylactic acid molding composition (PDLLA), and
e) at least one apparatus, downstream of the polymerization reactors, for mixing at least a portion of the meso-lactide-rich polylactic acid molding composition (PDLLA) and at least a portion of the L-lactide-rich polylactic acid molding composition (PLLA) or at least a portion of the D-lactide-rich polylactic acid molding composition (PDLA).

In particular, the apparatus for purifying the crude lactide (108) comprises an additional purification apparatus (121) for the meso-lactide-rich fraction (119), preferably a rectification column or a dividing wall column. Dividing wall columns and rectification columns are known, for example, from WO 2009/030395 A1. With regard to the principle construction of such purification apparatuses, reference is made to the disclosure content of this German Offenlegungsschrift. The purification apparatuses described therein, particularly the dividing wall column or the rectification column, are also suitable for the purposes of the present invention.

Preferred apparatus for purifying the crude lactide is a dividing wall column having at least two side draws and/or an apparatus for the recrystallization of the lactide from a melt or solution.

The apparatus for mixing is advantageously a static mixer for melt streams and/or a granulate mixer. In the mixer for melt streams, a static mixer for example, the polylactic acid melts produced can thus be directly mixed. However, it is also possible to initially carry out a separate granulation of the individual polylactic acid melts and to provide a granulate mixture. A combination is also feasible, for example, in which the melt streams are initially mixed to give a homogeneous mixture which is then granulated.

Downstream of the polymerization reactors is preferably connected downstream at least one feed for stabilizers and/or additives, at least one demonomerization apparatus, at least one granulation apparatus, at least one crystallization apparatus and/or at least one drying apparatus.

According to a further advantageous embodiment, downstream of the at least one first polymerization reactor and the at least one second polymerization reactor is
a) a combining of at least portions of the respective polylactide streams generated using a static mixer element and also optionally a possibility to add stabilizers and/or additives upstream of the static mixing element, or
b) a separate possibility to add stabilizers and/or additives in each case, followed by in each case a separate demonomerization apparatus, and/or
c) in each case a separate granulation apparatus and also a granule mixer.

Further preferably, an apparatus for generating a melt from the granulate is connected to the granule mixer, preferably an extruder and also an apparatus for processing the melt, in particular a granulation apparatus, a crystallization apparatus, a drying apparatus and/or an apparatus for preparing moldings.

The present invention also relates to a polylactic acid mixture. The polylactic acid mixture (PLA) is characterized by an average content of
- a) L-lactic acid units between 70 and 94% by weight, preferably between 80 and 94% by weight and D-lactic acid units between 6 and 30% by weight, preferably 6 to 20% by weight, or
- b) D-lactic acid units between 70 and 94% by weight, preferably between 80 and 94% by weight and L-lactic acid units between 6 and 30% by weight, preferably 6 to 20% by weight.

The tensile strength of the polylactic acid mixture (PLA) according to the invention is at least 60 MPa while at the same time the elongation at break is at least 5.0%, measured according to DIN EN ISO 527. The polylactic acid mixture is characterized here in particular by a high stability since these values, i.e. tensile strength and elongation at break can be retained at a temperature of 40° C. over at least 30 days even in moist air at 90% relative humidity.

A preferred embodiment of the polylactic acid mixture is characterized by a content of
- a) 1 to 50 parts by weight, preferably 1 to 30 parts by weight of a meso-lactide-rich polylactic acid molding composition (PDLLA) having a content derived from meso-lactide units of 15% by weight to 100% by weight, preferably 50 to 100% by weight, and
- b) 99 to 50 parts by weight, preferably 99 to 70 parts by weight of an L-lactide-rich polylactic acid molding composition (PLLA) having a content of 0 to 6% by weight of D-lactic acid units or a D-lactide-rich polylactic acid molding composition (PDLA) having a content of 0 to 6% by weight of L-lactic acid units.

It is advantageous in this case that the mixture, without adding nucleating agents and crystallization accelerators, has a degree of crystallinity which is at most 10% below the degree of crystallinity of a pure polymerized and crystallized L-lactide-rich polylactic acid molding composition (PLLA) having a content of 0 to 6% by weight of D-lactic acid units or a D-lactide-rich polylactic acid molding composition (PDLA) having a content of 0 to 6% of L-lactic acid units.

The polylactic acid mixture according to the invention can be present as a homogeneous mixture of the meso-lactide-rich polylactic acid molding composition (PDLLA) and the L-lactide-rich polylactic acid molding composition (PLLA) or the D-lactide-rich polylactic acid molding composition (PDLA) or as a granulate of this mixture. The invention also includes the possibility that the polylactic acid mixture is present having the aforementioned contents of L-, D-lactic acid units and/or PDLLA or PLLA in the form of a mixture of a granulate of the meso-lactide-rich polylactic acid molding composition (PDLLA) and a granulate of the L-lactide-rich polylactic acid molding composition (PLLA) or of the D-lactide-rich polylactic acid molding composition (PDLA). If this granulate mixture is melted and homogenized, a molding produced therefrom has the advantageous properties described above (tensile strength, elongation at break, etc.).

The polymeric acid mixture according to the invention described above can therefore be produced in this case, in particular according to the process described earlier.

As a preliminary matter, those having ordinary skill in the art will understand that all percentage data are expressed in percent by mass unless specified otherwise.

The term lactic acid unit is used for the lactic acid ester group having a molar mass of 72 Da, which is present in the lactide and in the polylactic acid.

The process according to the invention is described for the L-lactic acid raw material predominantly used in practice. However, the invention applies logically also to D-lactic acid raw material.

The designation PLLA is understood below to mean a PLA having a content of L-lactic acid units of more than 94%. The same applies to the designation PDLA and the content of D-lactic acid units.

The designation PDLLA is used for amorphous PLA having more than 6% D-lactic acid units.

In the preparation of PLA by ring-opening polymerization of lactide, the lactic acid raw material is generally converted by polycondensation into an oligomer having a molar mass of 162 to around 5000 Da. By cyclizing depolymerization of the oligomer, a lactide mixture (crude lactide) is then obtained which predominantly comprises L-lactide in the case of L-lactic acid as raw material but in addition also meso-lactide and D-lactide and also lactic acid and a series of linear and cyclic oligomers of lactic acid. In order to produce an industrially usable PLA from the crude lactide, not only must lactic acid and linear oligomers be removed but also meso-lactide and, if applicable, D-lactide.

The industrial applicability of PLA depends heavily on its melting point and crystallizability, and this in turn on its content of optical enantiomers. In the case of PLAs consisting predominantly of L-lactic acid units ("PLLA"), these are meso-lactide and D-lactide. In the case of PLAs consisting predominantly of D-lactic acid units ("PDLA"), these are meso-lactide and L-lactide. The content of these optical isomers in PLA is mainly determined by the composition of the lactide used for the polymerization. Meso- and D-lactide form in the L-lactide as a result of, for example, L-lactic acid raw material being contaminated with D-lactic acid. Likewise, meso-lactide and L-lactide in the D-lactide is due to L-lactic acid impurities in D-lactic acid.

In addition, especially in the depolymerization of the oligomer, partial racemization occurs of the lactide enantiomer predominantly present. The catalyst used for the depolymerization and the high temperature favor the racemization. Racemization converts L-lactic acid units in the L-lactide to D-lactic acid units. In the conversion of only one lactic acid unit in the L-lactide meso-lactide is thus formed while the conversion of both lactic acid units leads to the formation of D-lactide. D-lactide is therefore a conversion product of the partial racemization of meso-lactide, which in turn arises from L-lactide. In the industrial production processes of PLA, process conditions are sought, particularly residence times and temperatures, which keep the partial racemization as low as possible. Hence, the concentration of the D-lactide in the crude lactide from these processes is always very much lower than that of the meso-lactide.

This applies analogously to the racemization of D-lactide to meso- and L-lactide. Although D-units in the form of meso-lactide or D-lactide may be present in the PLLA, only the content of D-lactic acid units is discussed below, since this is more readily accessible analytically.

Industrially usable PLLA comprises between 0% and about 6% D-lactic acid units. Different applications require different content of enantiomers. For instance, for textile applications PLLA with 0% to 2%, for films and bottles PLLA with 3 to 4% D-units is used, for special applications up to 6%.

PLA having more than 6% D-units is generally not crystallizable and therefore has no melting point but rather a softening point which coincides with the glass transition temperature. Such a PLA is not usable for most technical purposes since, in contrast to semicrystalline PLA, it has no thermal stability and resistance to hydrolysis and the mechanical and thermal properties are considerably less favorable.

The limit of 6% is to be understood to mean a lower limit. It is possible under certain circumstances to produce still crystallizable PLA with a somewhat higher D-content. It depends in which form the D-units are present in the lactide before polymerization: D-lactide comprises twice as many D-lactic acid units in the molecule as meso-lactide. At the same D-content, however, meso-lactide causes a stronger melting point depression in the PLA than D-lactide, and leads to amorphous PLA even at 6% D-content. If D-lactide is present in the raw material of the polymerization in addition to meso-lactide, the limit of the D-content at which amorphous PLA is attained increases with increasing D-lactide content. Since considerably more meso-lactide than D-lactide is formed in the partial racemization of L-lactide, for a PLA process such as the one which forms the basis of the present invention, the limit for amorphous PLA is reached at about 8% D-content.

Crude lactide from the depolymerization of an L-lactic acid oligomer comprises between about 8% and 15% D-units. The proportion varies according to the purity of the lactic acid used as raw material, the type and amount of depolymerization catalyst, the design principle and the number of depolymerization reactors, the temperature, the pressure and the residence time in the depolymerization. In order to produce the polymerizability to PLA, it would be sufficient to remove only lactic acid and linear oligomers. In the best case, this PLA would have the same concentration of D-units as the crude lactide. Experience shows that this PLA comprises even a little more since a small degree of racemization occurs also during the polymerization.

Therefore, no industrially usable PLA can be produced from a PLA of L-lactide units having 8-15% D-units. For this purpose, in the purification, meso-lactide and optionally D-lactide must be removed or their concentration must be adjusted to a desired degree. In an industrial process, this leads to one or more by-products which comprise meso-lactide and D-lactide in concentrated form compared to the L-lactide main product. Since meso- and D-lactide cannot be clearly separated from the L-lactide main product, the by-product still also comprises L-lactide which increases the proportion of by-product.

The process according to the invention increases the yield of industrially usable PLLA in a process of ring-opening polymerization by making meso- and D-lactide-containing by-products usable for PLA production.

It has been found that a crystallizable PLA is formed when polymerized meso-lactide or a polymerized meso-lactide-rich fraction (PDLLA) is added in a melt to a PLA consisting mainly of L-lactide (PLLA). It has been found, surprisingly, that a mixture comprising 6 to 30% D-lactic acid units has largely the same technical properties as the PLLA used as a component of the mixture. In this case, certain limits in the mixing ratio and the molar mass of the PDLLA should be maintained (can be determined by the intrinsic viscosity IV). Within the scope of the measurement precision, the mixture has an identical melting point, even higher crystallization rate, identical strength, elongation, modulus of elasticity, impact resistance and resistance to hydrolysis. Even the processability to, for example, fibers, films, thermoformed articles or injection-molded parts is not impaired.

This applies to a proportion of polymerized meso-lactide or meso-lactide-containing fraction (PDLLA) in the mixture of 1% to 50%, preferably 1% to 30%. A proportion of 30% is not normally exceeded when only the D-containing by-product is processed in a manner according to the invention in one and the same plant. It is also possible, however, to combine the D-containing by-products of two or more, preferably adjacent PLA plants in one system and to process them with the process according to the invention. In this case, PDLLA proportions in the mixture of up to 50% are possible.

The PLLA consisting predominantly of L-lactide units has in this case a content of D-lactide units of 0% to 6%. The meso-lactide-rich fraction has a proportion of meso-lactide between 15 and 100%, preferably between 50 and 100%.

The invention is capable of considerably increasing the yields of PLA in a process consisting of the steps of 1. Polycondensation of the lactic acid to give an oligomer
2. Cyclizing depolymerization of the oligomer to give lactide
3. Purification of the lactide
4. Ring-opening polymerization to give PLA
5. Stabilization and demonomerization of the PLA.

This also applies to a process which generates the oligomer in step 1 via a polytransesterification of lactic acid esters such as methyl or ethyl lactate and otherwise uses steps 2 to 5.

The increase in yield of PLA according to the invention also applies to a process which is oriented towards the production and sale of polymerizable lactide which is spatially separated from the polymerization of the lactide. In this case, both purified lactide fractions are temporarily stored in suitable form, transported to the site of the polymerization, there each separately polymerized to PLLA and PDLLA and the two polymers mixed with each other in a melt.

The lactide is purified in this case by rectification or by recrystallization from the melt of from a solution. Combinations of rectification and recrystallization are also suitable for this purpose, for example, see WO 2009/030395 A1.

The purification methods mentioned are operated so that a first fraction comprising predominantly L-lactide is formed and a second fraction comprising 15 to 100% meso-lactide. Further fractions produced in the purification in certain circumstances may be added to this second fraction, which further fractions comprise D-lactide and/or meso-lactide in enriched form compared to the first fraction.

Both the rectification and the recrystallization offer several possibilities to influence the amount and composition of the two fractions and to adjust to desired values. The adjustability has natural limits in terms of mass balances, in particular here the enantiomers of the lactide. For example, a relatively high purity of the first fraction with respect to L-lactide inevitably leads to a lower yield of this fraction and to a displacement of the meso-lactide into the second fraction, whose amount therefore increases.

For instance, the first fraction, depending on the intended application of the PLLA produced therefrom, is adjusted to a D-content between 0 and 6%, wherein the D-proportion consists of meso- and/or D-lactide and is calculated by addition of the D-lactide fraction and of half the meso-lactide fraction. The composition of the second fraction is then no longer so freely selectable as that of the first fraction.

It is limited by the composition of the crude lactide, by the mass balance of the lactide enantiomers and the selectivity of the purification methods used. It can still be influenced within the limits mentioned by the design and operation of the rectification and/or the recrystallization. The second fraction can therefore assume a meso-lactide content between 15% and 100%, the range between 50 and 100% being preferred. The residue consists of L- and D-lactide.

In the purification, the carboxyl group content of the second, meso-lactide-containing fraction is advantageously adjusted to a value below 10 mmol/kg, preferably below 5 mmol/kg, particularly preferably below 3 mmol/kg. At this purity, the fraction can be brought to an IV of 0.8 to 1.80 by ring-opening polymerization using a suitable catalyst. Suitable catalysts are the same as for the polymerization of L-lactide in the melt.

The first fraction comprising predominantly L-lactide is polymerized in a known manner by ring-opening up to an IV between 1.0 and 2.0 (see, e.g., WO 2009/030397 A1).

FIG. 1 shows a scheme of a continuous overall process for producing polylactide mixture (PLA) starting from lactic acid. The process is divided into the following substeps, which are pre-rented individually below.

1. Concentration of Lactic Acid

The starting material for the process is lactic acid or an aqueous solution of lactic acid. The content of lactic acid acid in this case should be higher than 80% by weight. The lactic acid concentration here is preferably more than 90% since the water should be removed before the polymerization. The separation of water and lactic acid is preferably carried out in this case in a rectification column 101. A vacuum is applied via a suction stub 130, the water obtained in vaporous form is condensed and is removed from the top via a further stub 103. The lactic acid feed takes place continuously via a further stub 102. The distillate is pure water, the product obtained at the bottom is lactic acid having a concentration of more than 99% by weight.

In addition to the removal of water from the source material (lactic acid), the rectification column 101 also serves for the separation of the vapors from the precondensation reactors 105a and 105b. The vapor streams here consist of lactic acid, lactoyllactic acid, dilactide and water. The water is drawn off at the top, lactic acid and derivatives thereof go into the bottoms of the rectification column 101 and from there into the first polycondensation reactor 105a together with the concentrated lactic acid.

2. Polycondensation

The concentrated lactic acid is converted into a prepolymer or oligomer by polycondensation in a series of two reactors 105a and 105b. The polycondensation proceeds under two different pressures and temperatures in order to optimize the reaction conversion. The conditions in the first reactor 105a are selected such that the evaporation of lactic acid is minimized and at the same time the removal of water is facilitated. In the second step of the polycondensation, the reaction rate is increased by means of a higher temperature, simultaneously the pressure is reduced, in order to further reduce the water concentration in the melt. The average molar mass (number average) of the prepolymer is here between 500 and 2000 g/mol.

3. Cyclizing Depolymerization

The prepolymer exists in chemical equilibrium with the cyclic dimer of lactic acid, the dilactide. By adjusting pressure and temperature in the depolymerization reactor 106, it is ensured that the lactide of the prepolymer is formed continuously and evaporated. A lower proportion of unreacted residue 100 remains in this case, which is discarded.

The vapor stream of the depolymerization reactor 106 consists mainly of lactide. Water, lactic acid and linear oligomers thereof are only present in minor amounts. A condenser 104 is linked to the depolymerization reactor 106, which partially condenses the reaction vapors. Water and the major portion of lactic acid remain here in the vapor state and leave the condensation apparatus 104 uncondensed. The condensate from the depolymerization reactor 106 comprises mainly the lactide, lactoyllactic acid (the linear dimer of lactic acid) and higher linear and cyclic oligomers. The condensate is also referred to as crude lactide. Lactide is present in three stereoisomeric forms: the optically active L-lactide and D-lactide and the optically inactive meso-lactide, composed of a combination of an L- and D-lactic acid unit. In the case of starting from L-lactic acid, for example, the D-units originate possibly in part from the reactant (since this has, for example, a low percentage of D-lactic acid), and in part they are formed by racemization of L-units during the prepolymerization and the depolymerization.

4. Lactide Purification

During the ring-opening polymerization, the molecular weight achievable, and thus significant mechanical properties of the polylactide depend on the degree of purity of the lactide. The hydroxyl groups of the lactic acid and lactoyllactic acid present as impurity serve here as starting point of the polymerization. The higher the concentration of hydroxyl groups in the lactide, the lower the achievable molecular weight of the polymer. The concentration of hydroxyl groups in the crude lactide is possibly too high after the cyclizing depolymerization. The crude lactide condensed in the condensation apparatus 104 is fed to a purification apparatus 108 via an appropriate line 107. A suitable purification apparatus is, for example, a dividing wall column known from WO 2009/030395 A1. With this apparatus, a separation can be enabled of the crude lactide, for example, into a meso-lactide-rich fraction and an L-lactide-rich fraction. The meso-lactide-rich fraction is removed at the top draw-off 119, while the L-lactide-rich fraction is removed from the bottom draw-off 120. The meso-lactide-rich fraction is preferably further purified with a further rectification column 121 (also described in WO 2005/030395 A1). Streams at the top, which possibly may still comprise lactic acid and water etc., are fed in this case to the condenser 104, and fractions obtained at the bottom are led either to the precondensation reactors 105 or put back again into the dividing wall column 108.

5. Ring-Opening Polymerization

It is provided according to the process according to the invention that both lactide fractions obtained are each fed to a separate ring-opening polymerization. The L-lactide-rich fraction is subjected to a ring-opening polymerization in a polymerization reactor 109, 109A and the meso-lactide-rich fraction in a separate polymerization reactor 110, 110a.

The ring-opening polymerization is undertaken in each case in a reactor which is made up of a stirred tank 109 or 110 and a tubular reactor 109a or 110a. In the stirred tank 109 or 110, the low-viscosity lactide is polymerized to PLA with a conversion rate of ca. 50%. Catalyst and additives are mixed homogeneously into the melt.

The polymerization reaction in tubular reactor 109a or 110a is continued until a chemical equilibrium between polymer and monomer is reached. The maximum conversion of the monomer is ca. 95%. During the polymerization, the viscosity increases to ca. 10 000 Pa·s.

According to the embodiment illustrated in FIG. 1, it is now intended that the two polylactide melts are now removed directly from the respective tubular reactors 109a and 110a and are directly, i.e. in the molten state, mixed with each other. For this purpose, stream 123 withdrawn from reactor 110a, for example, is combined with the polymer melt stream withdrawn from reactor 109a.

A suitable deactivator 122 can be added to the combined melt, for example, phosphoric acid at a suitable concentration. Preferably before or during the mixing of the two streams, stabilizers are also added, in particular a deactivator for the polymerization catalyst. If desired at this point, further additives are added, e.g. end group stabilizers, nucleating agents, crystallization accelerators, dyes, stabilizers of thermal, oxidative and hydrolytic degradation. Stabilizers and additives may also be added, however, after the mixing of the two polymer streams.

Complete homogenization of the polymer melt is enabled by means of a static mixer 112 arranged downstream. The residence time of the melt in the mixer can be between 1 and 20 minutes, 3 to 10 minutes being preferred.

The melt is subsequently demonomerized and granulated under vacuum, wherein known apparatus and machines are used for this, e.g. degassing extruder.

6. Demonomerization

In order to obtain a stable polylactide, a monomer concentration in the melt of about 5% by weight is too high. For this reason, demonomerization should be carried out. This is achieved by degassing the melt, for example, in a twin-screw extruder 111.

The twin-screw extruder 111 is connected to the vacuum supply 130, in between which a further condensation apparatus 104a may be arranged in order to recover the monomers.

Due to the fact that the ring-opening polymerization is an equilibrium reaction, a stabilizer is preferably added prior to the demonomerization in order to prevent the reformation of the monomer during and after the degassing.

7. Granulation and Crystallization

After the demonomerization, the melt is removed from the extruder 111 and transferred to a granulation apparatus 113. In this case, either strand granulation or underwater granulation maybe carried out. In both cases, the PLA granules must be crystallized before drying and packaging. The crystallization 114 is carried out at elevated temperatures and with stirring until the granules no longer adhere to one another.

Finally, the granules can be dried in a suitable drying apparatus 115 and the finished product 116 can be removed from the dryer 115. A pellet dryer, e.g. a tower dryer with a stirred crystallization zone in accordance with U.S. Pat. No. 5,558,678, crystallizes and dries the granulate which is then available for further processing. The resulting product 116 is semicrystalline and comprises 6-30% D-lactic acid.

According to this preferred embodiment of the invention, the two fractions are polymerized separately from each other, e.g. in two parallel lines of a polymerization plant separated from each other. Both polymer streams, which comprise lactide still unreacted after the polymerization, are combined and mixed together, e.g., in a static mixer.

In the following Figures, the same reference numbers refer to the same components as in FIG. 1. To avoid repetition in relation to the process sequence, refer to the comments on FIG. 1.

Figure 1A:
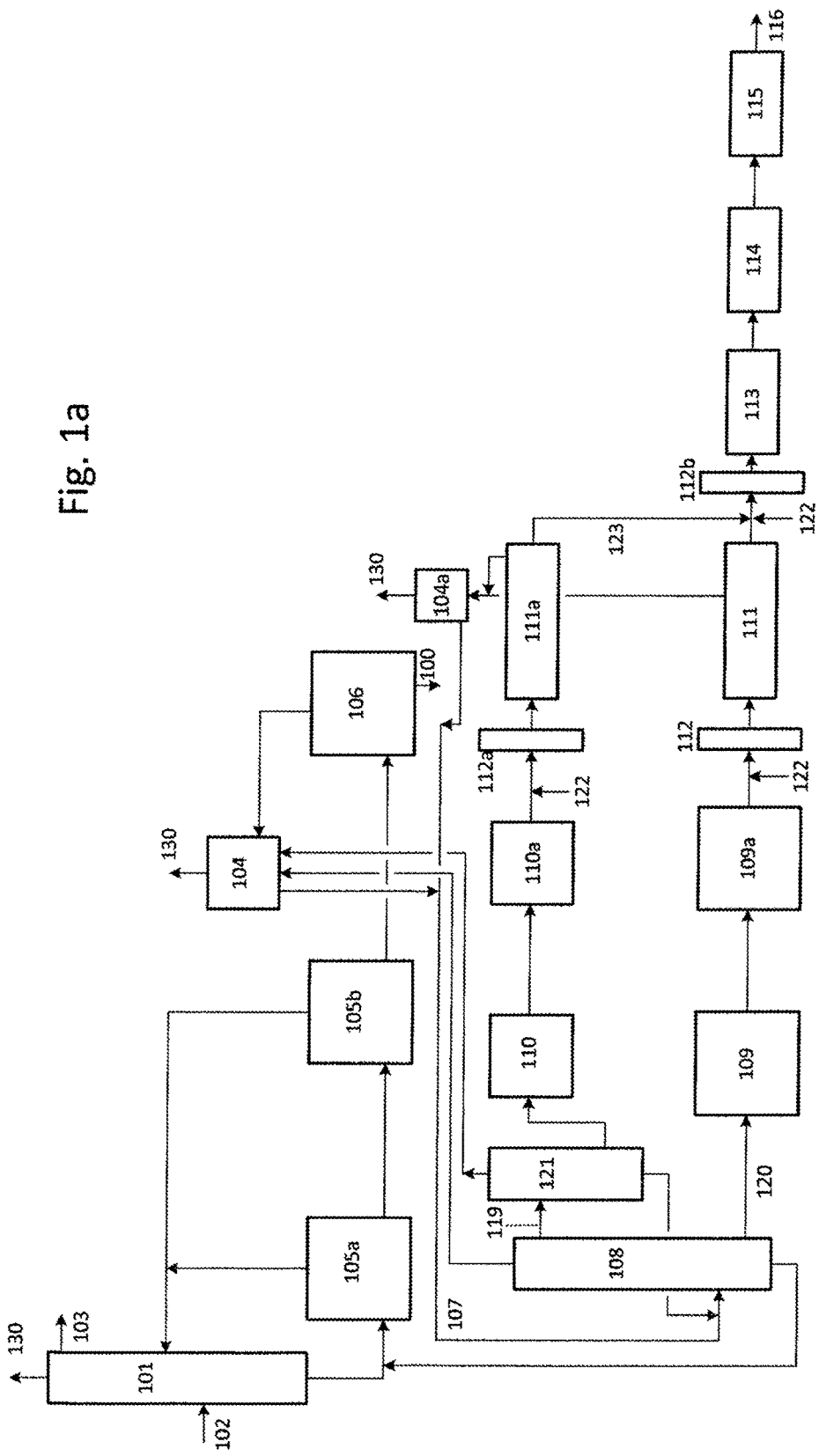
FIG. 1a is a schematic view of another example process for preparing a crystallizable polylactic acid mixture from lactic acid.

The alternative embodiment shown in FIG. 1a in principle proceeds identically with the process regime as shown in FIG. 1 up to the polycondensation. In contrast to the process regime according to FIG. 1, however, a separate deactivation 122 of the individual polymer streams, which originate from reactors 109a and 110a, is carried out. Likewise, separate mixing of the deactivator takes place at 112 and 112a and also a separate demonomerization 111 and 111a. Only after that are the two polymer streams combined at 123, and also further additives are added at 122 if required. Before the task of the polymer stream in the granulation apparatus 113, a homogenisation is again preferably carried out by means of a further static mixing element 112b.

The semicrystalline product 116 also forms here having a content of D-lactic acid units of 6-30%.

In a further preferred embodiment of the invention (FIG. 2), only a portion 123 of the first fraction 109a comprising predominantly L-lactide after polymerization is mixed with the polymerized meso-lactide-rich second fraction 110a. The mixture and the unmixed partial stream are separately demonomerized, granulated, crystallized, dried and packaged. A plant, which operates according to this embodiment, can generate two different product types at the same time: a PLLA 117 having 0-6% D-content and a semicrystalline PLA 116 having 6-30% D-content in accordance with the invention. In the case where the partial stream diverted for mixing with the PDLLA stream approaches zero, the amorphous PDLLA 118 can also be produced with a plant according to embodiment 2, in addition to the PLLA, instead of the semicrystalline PLA 116 according to the invention. In this case, the crystallization 114a is not effective.

Figure 3:
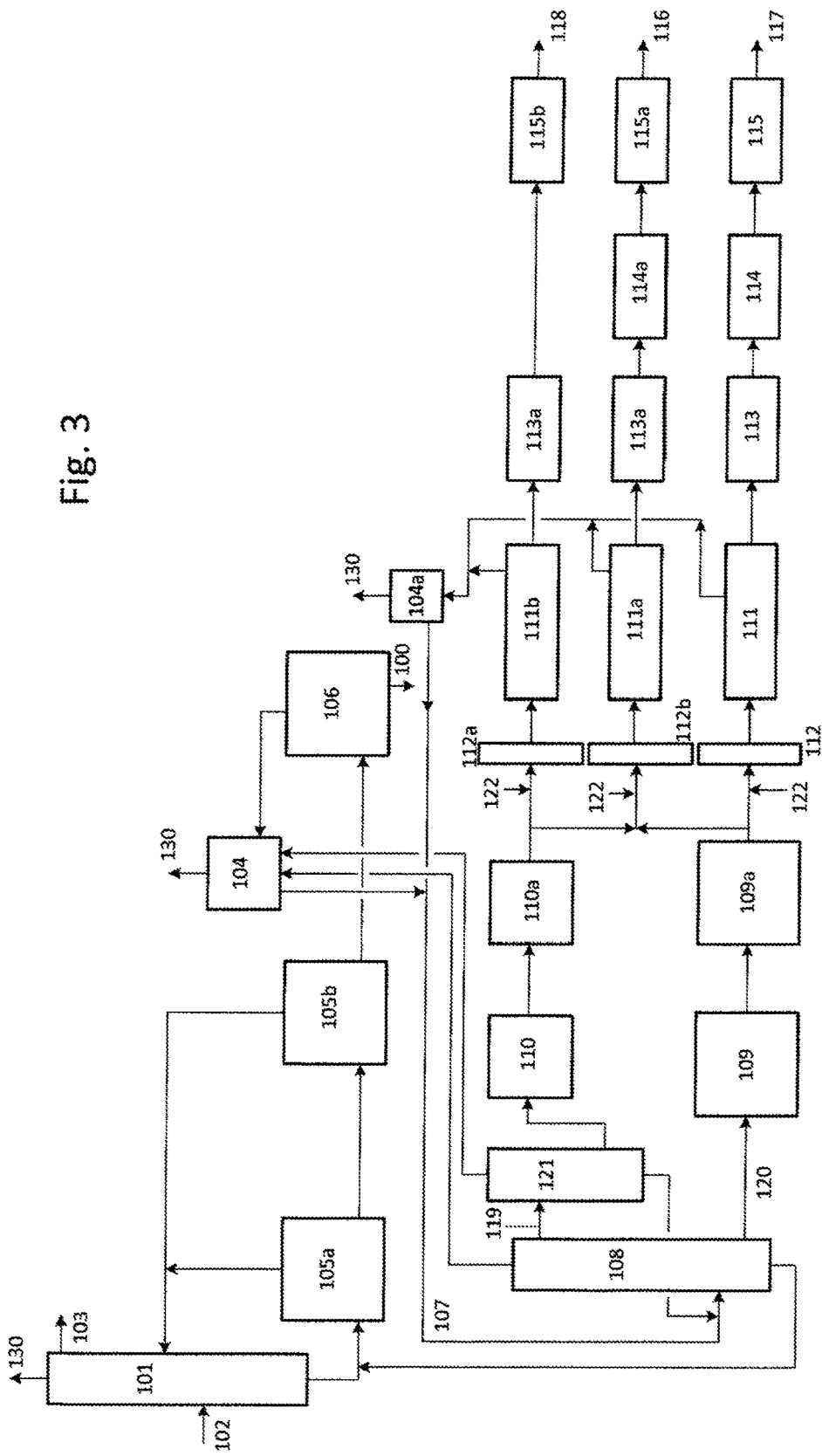
FIG. 3 is a schematic view of yet another example process for preparing a crystallizable polylactic acid mixture from lactic acid.

In a further embodiment of the invention (FIG. 3), a portion of the second, meso-lactide-rich fraction after polymerization 110a is mixed with a portion of the polymerized first fraction 109a consisting predominantly of L-lactide, demonomerized, crystallized, dried and packaged. The two unmixed partial streams of the polymerized first and second fraction are separated therefrom and are demonomerized separated from each other. The crystallizable partial stream (the middle product line in FIG. 3) is further processed in the same manner as described in the embodiment according to FIG. 1. The non-crystallizable partial stream of the polymerized meso-lactide-rich fraction forms an amorphous granulate after granulation, which is dried below its softening point (glass transition point) and packaged. It is suitable for special applications, in which a low melting point is desired, e.g. for heat-sealable films. A plant, which operates according to this embodiment, can generate three different product types at the same time: a PLLA 117 according to the prior art, an amorphous PDLLA 118 having 6-60% D-fraction with a softening point below 60° C., and a semicrystalline PLA 116 having 6-30% D-fraction.

In all embodiments of FIGS. 1, 1a, 2 and 3, the PLA melt can be fed directly without granulation etc. to further processing, e.g. to fibers, films or injection-molded articles. Whether this direct processing is selected depends primarily on whether the capacity of the polymerization plant matches the capacity of the processing plant. In most cases, however, the capacity of the polymerization is considerably greater than that of the processing, such that the route via the granulate is preferred. It is however possible, to process only a part of the capacity of the polymerization plant directly from the melt and to supply the remaining capacity to a granulation.

Figure 4:
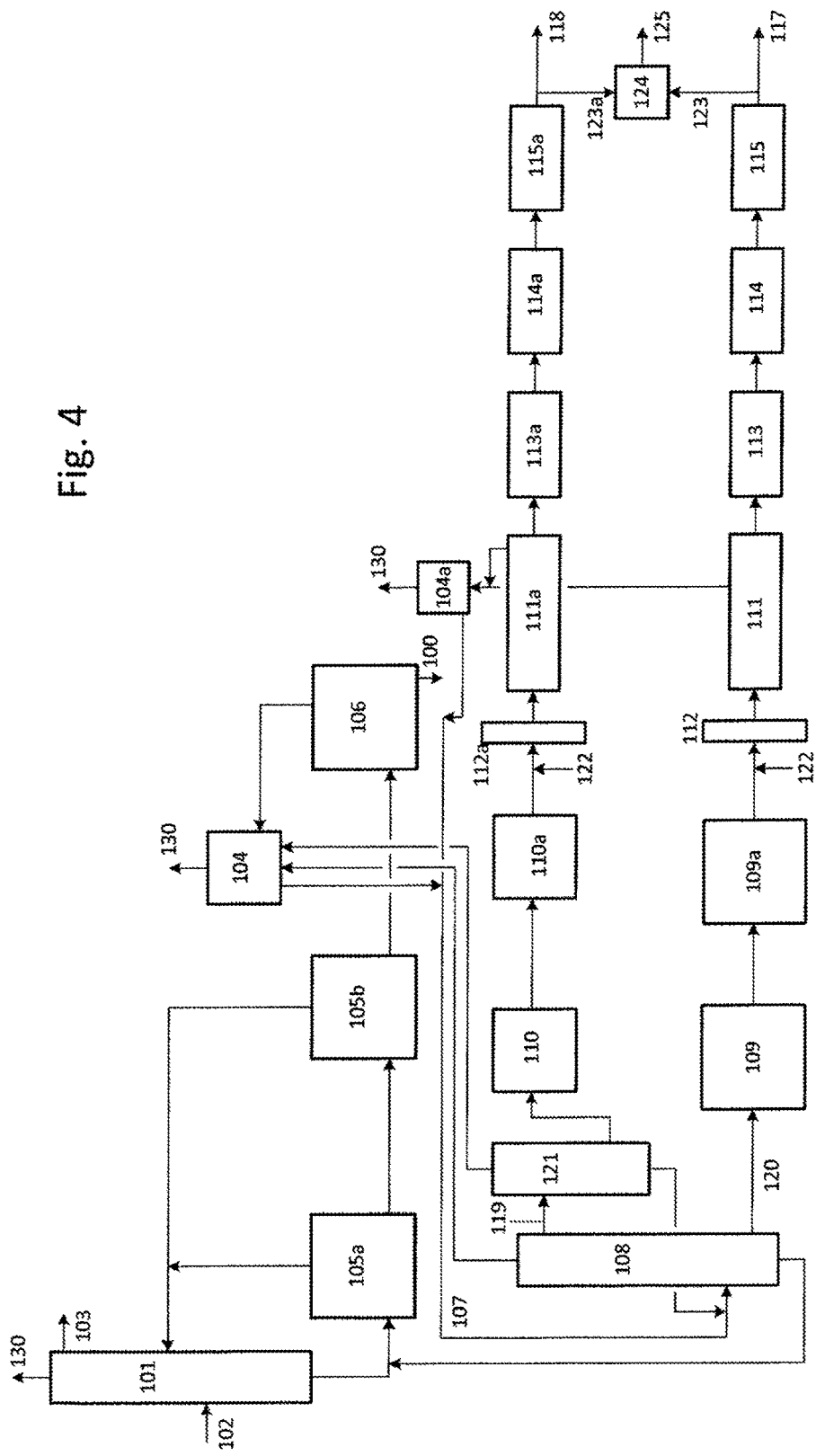
FIG. 4 is a schematic view of a further example process for preparing a crystallizable polylactic acid mixture from lactic acid.

In a further embodiment, the two polymer streams are polymerized, stabilized, demonomerized, granulated and dried separately from each other according to FIG. 4. Subsequently, the granules are mixed with each other in a granulate mixer 124. Optionally after temporary storage, the granulate mixture 125 can be transported to the processor and be melted and homogenized there. The melt is then further processed to, for example, fibers, films and injection-molded articles.

Alternatively or at the same time, the two granulated PLA types 117 and 118 can be transported separately to the site of the further processing plant and mixed there, melted in an extruder and homogenized and be processed to films, fibers or injection-molded articles.

The mixing of the two granulated fractions can thus optionally already take place at the site of the polymer production or at the site of the further processing. The properties of the mixture according to the invention, however, are not attained until after the melting, mixing and homogenization in the melt.

Figure 4A:
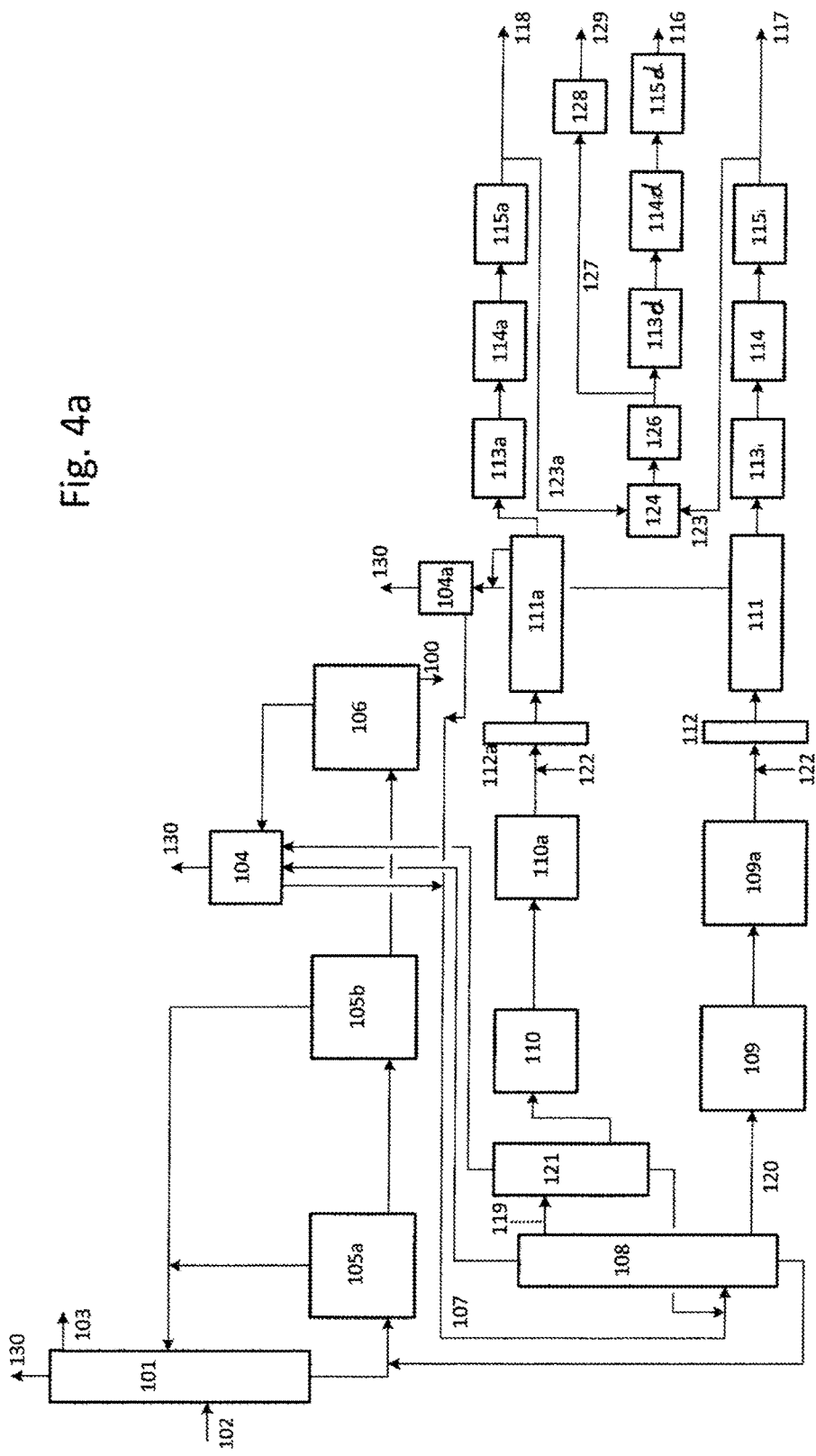
FIG. 4a is a schematic view of an additional example process for preparing a crystallizable polylactic acid mixture from lactic acid.

The mixture of the two PLA types according to the invention can also be produced in the PLA production plant according to FIG. 4a. In this case, the granulates 117 and 118 are mixed with each other 124 in the desired ratio (by adjusting or regulating the streams 123 and 123a), are melted together 126 and homogenized. The melt is subsequently granulated again 113d, crystallized 114d, dried 115d and the granulate 116 according to the invention transported to the further processing site. However, a direct processing 128 of the melt 127 to, for example, fibers, films and injection-molded articles 129, is also possible.

This embodiment has advantages if the ratio in the mixture of the two partial streams should be freely selectable. The smaller partial stream, the polymerized meso-lactide-rich fraction, can be conveniently stored, without loss of quality, as a granulate. In this manner, three different PLA types can be generated with lower apparatus complexity than in the embodiment according to FIG. 3: a PLLA 117 according to the prior art having 0-6% D-fraction, a semi-crystalline PLA 116 according to the present invention having 6-30% D-fraction and an amorphous PLA having 6-60% D-fraction 118 for specific low-melting applications.

This embodiment can also be advantageous when only one polymerization strand is available in the plant. This is utilized alternately for the polymerization of the first and second lactide fraction, wherein the currently non-polymerized fraction is simply temporarily stored. The lactide fractions may be temporarily stored in liquid form (as described for example in EP 2 161 263 A1) or, after granulation, in solid form.

The processes shown in FIGS. 1 to 4 are understood to be examples, which relates in particular to the type and arrangement of the purification apparatuses and mixers and the location for the addition of stabilizers and additives. All other types and arrangements of purification apparatuses and all suitable locations for the addition of stabilizers and additives, which fulfill the purpose of the invention, are included here.

The PLA mixture according to the invention having a D-content of 6.0 to around 30% can be used in the same manner as a PLLA having a D-content between 0% and 6%, i.e. for producing transparent or opaque packaging articles, such as unstretched and mono- or biaxially stretched films, thermoformed films, bottles, and injection-molded parts, fibers and filaments.

The specified analytical methods are used for the following examples.

Analytical Methods
1. Melting Point Determination of PLA Using DSC Method
   In a DSC 7 DSC instrument from Perkin Elmer, a weighed sample is heated at a heating rate of 5 K/min from 0° C. to 250° C., cooled to 0° C. and heated a second time to 250° C. The endothermic or exothermic heating effects that occur are recorded via the temperature and characteristic variables, such as melting point, glass transition point, enthalpy of fusion are evaluated using the internal instrument software. Melting point and glass transition temperature are recorded during the second heating procedure.
2. Determination of the Degree of Crystallinity by the DSC Method
   The sample is treated as described under 1. To calculate the degree of crystallinity, the enthalpy of fusion of the sample measured in the first heating procedure is divided by the heat of fusion of the pure crystalline phase (100% crystalline PLA). This is 91+/−3 J/g according to M. Pyda et al., J. Chem. Thermodynamics 36 (2004) 731. The degree of crystallinity is the quotient of enthalpy of fusion of the sample and of the 100% crystalline PLA.
3. Determination of the Concentration of L-, D- and Meso-Lactide in a Lactide Mixture
   The lactide sample is dissolved in a mixture of 90/10 ml/ml n-hexane/ethanol. The dissolved components are analysed by HPLC separated on a chiral column and using a UV detector at 223 nm.
4. Determination of the Content of L- and D-Lactic Acid Units in PLA and Lactide
   A sample of PLA or a PLA oligomer is hydrolyzed with boiling 1-n aqueous sodium hydroxide solution under reflux and neutralized after cooling. The neutralized sample is mixed with 3 millimolar copper sulfate solution in a 1/9 ml/ml ratio and separated into components by HPLC on a stereospecific column, which are subsequently analyzed using a UV detector at a wavelength of 238 nm.
5. Determination of the Molar Masses and the Polydispersity Using Gel Chromatography
   A GPC apparatus from WEG Dr. Bures was used with the columns PLgel 5 µm 100 000, PLgel 5 µm 10 000, PLgel 5 µm 100 and a refractive index detector. The solvent was dichloromethane. Number-average and weight-average of the molar mass and the polydispersity was evaluated using the ParSEC Chromatography software.
6. Determination of the Intrinsic Viscosity (I. V.) of PLA
   The weighed amount of polymer is dissolved in a defined volume of chloroform. In an Ubbelohde capillary viscometer, which is located in a water bath thermostatically adjusted to 20° C.+/−0.1° C., the throughput time of the solution and the pure solvent is measured. The quotient of the two is the relative solution viscosity. It is converted into the intrinsic viscosity (I.V.) using the single point method according to J. Dorgan et al., J. Polym. Sci.: Part B: Polym. Physics, Vol. 43, 3100-3111 (2005).
7. Determination of the Carboxyl Group Concentration of Lactide
   The lactide sample is dissolved in methanol. The solution is then titrated at 20° C. with 0.1 N benzyl alcoholic KOH solution. The end point is detected potentiometrically.
8. Thermally Induced Crystallization of PLA Granules
   10 g of PLA granules in the amorphous state, having a maximum individual grain weight of 30 mg, is crystallized in a vacuum drying cabinet at 120° C. and a pressure below 1 mbar for 24 h. After cooling of the sample, the degree of crystallinity is measured by DSC (see 2.).

EXAMPLES

Example 1: Production of the Mixture According to the Invention

A continuous pilot plant for producing PLA granules from lactic acid is constructed according to FIG. 1:

Lactic acid having a 10% proportion of water (102) is dewatered in a rectifying column. The approximately 100% strength acid goes into a two-stage reactor cascade (105a, 105b) in which an oligomer having a molar mass of 800 Da is formed by polycondensation. The chemically formed water evaporates there under vacuum together with a portion of the unreacted lactic acid. To recover the lactic acid, the vapor returns to the rectification column 101. The water obtained at the top (103) is removed from the process at this point. The oligomer of 105b goes into a further reactor 106, where lactide is formed by cyclizing depolymerization under the influence of temperature and a catalyst, which lactide is evaporated in the vacuum and is liquefied in a condenser 104. Residues of lactic acid and water are removed here (103). A residue is formed in the depolymerization which comprises thermal degradation products in addition to oligomers of lactic acid. The residue is removed and discarded via the optional draw-off 100.

The crude lactide 107 generated by cyclizing depolymerization comprises 82.4% L-lactide, 3.4% D-lactide and 14.2% meso-lactide. The content of lactic acid and linear oligomers is detected by the carboxyl group concentration, which here is 140 mmol/kg. The purification of the crude lactide generated is performed in a rectification column 108, which is described in more detail in WO 2009/030395 A1. The pressure at the top of the column is 22 mbar. Crude lactide is fed in at an intermediate height. At the top of the column, the low-boiling constituents of the crude lactide are obtained, especially residues of water and lactic acid. In the column bottoms, linear and higher cyclic oligomers of lactic acid accumulate. These return to the polycondensation 105a. The fraction comprising predominantly L-lactide is removed as side draw 120. It comprises 93.4% L-lactide, the remainder consisting of 3.1% D- and 3.5% meso-lactide. The carboxyl group concentration is 11 mmol/kg, by means of which the fraction is polymerized without further purification. This is done by addition of tin(II) octoate catalyst in a reactor cascade consisting of two continuously operated reactors 109 and 110. The polymerization is performed at an end temperature of 185° C. up to an I.V. of 1.85 and a conversion of 97.5%.

The fraction 119 enriched with meso-lactide is likewise removed as side draw from column 108, wherein the withdrawal point, corresponding to the lower boiling point of meso-lactide compared to L-lactide, is arranged above the withdrawal point of the L-lactide fraction 117. This second fraction comprises 50.6% meso-lactide and 47.6% L-lactide. In addition, it also comprises 20 mmol/kg carboxyl groups due to its closer proximity to the top of the column.

This fraction is separated further in a second rectification column 121. The column operates at a pressure at the top of 15 mbar. A polymerizable fraction is withdrawn as a side stream. It comprises 56.7% meso-lactide in addition to 42.0% L-lactide and 1.3% D-lactide. The concentration of carboxyl groups is 6 mmol/kg. This fraction is polymerized in a reactor cascade of two continuous flow reactors at an end temperature of 150° C. up to a residual monomer content of 4% and an I.V. of 0.95 g/dl. Tin(II) octoate serves as polymerization catalyst.

This melt stream is combined with the melt stream from the polymerization of the fraction comprising predominantly L-lactide and pressurized by a static mixer 112. The proportion of melt stream produced from predominantly meso-lactide in the mixture is 12%. Before the static mixer, phosphoric acid is added to the melt as deactivator of the catalyst. The melt is then demonomerized (111) under vacuum and processed in a granulating machine to give granules under quenching with water. The granules are crystallized in a continuous tower dryer with crystallization zone (114) at 120° C. and dried (115) and packaged after cooling to below 50° C. The lactide separated in the demonomerization under vacuum is fed back after condensation (103) into the column 108.

The granules have a melting point of 161.2° C., a D-content of 8.4% and a degree of crystallinity (DSC, method see appendix) of 36.7%.

The molar yield of semicrystalline PLA granulate is in this example 95.0% of the theoretical value (mol of lactic acid units in the PLA per mol of lactic acid used), based on the lactic acid used. The same process without the inventive process (discarding the meso-lactide fraction and counting as a loss) would have a yield of only 83.6%. The example according to the invention thereby leads to a yield increase of semicrystalline PLA by 11.4%.

Example 2: Production of the Mixture According to the Invention

The pilot plant according to example 1 is adopted with the same setting as in example 1. Only the setting of the second rectification column is changed so that a larger amount of polymerizable meso-lactide fraction is formed as side stream than in example 1. The fraction comprises 40.2% meso-lactide in addition to 58.4% L-lactide and 1.4% D-lactide. The concentration of carboxyl groups is 3 mmol/kg.

This fraction is polymerized in a reactor cascade of two continuous flow reactors at an end temperature of 150° C. up to a residual monomer content of 3.5% and an I.V. of 1.45 g/dl. Tin(II) octoate serves as polymerization catalyst. This PDLLA is mixed with the PLLA polymerized in parallel, the proportion of PDLLA in the mixture being 16.7%.

The granulate produced from the mixture of the PLLA with the PDLLA has a melting point of 160.1° C., a D-content of 9.5% and a degree of crystallinity (DSC) of 36.8%.

The molar yield of semicrystalline PLA granulate is in this example 96.0% of the theoretical value (mol of lactic acid units in the PLA per mol of lactic acid used), based on the lactic acid used. The same process without the inventive process (discarding the meso-lactide fraction and counting as a loss) would have a yield of only 80.0%. The example according to the invention thereby leads to a yield increase of semicrystalline PLA by 16%.

Comparative Example 3: Separate Production of PLLA and PDLLA

The pilot plant of example 1 is operated in the same manner as described in example 1. The polymer produced predominantly from L-lactide (PLLA) is mixed according to FIG. 2 not with the polymer produced predominantly from meso-lactide (PDLLA) but rather both melt streams are mixed separately with the phosphoric acid stabilizer, demonomerized and granulated.

The PLLA granules have a melting point of 157.6° C., a D-content of 5.4% and a degree of crystallinity (DSC) of 42.2%. The PDLLA granules show a glass transition point at 52.4° C. and no melting point. The product is amorphous.

Example 4: Injection Molding, Thermal Properties and Molar Mass

PLLA, PDLLA from comparative example 3 and the mixture having 12% PDLLA from example 1 were carefully dried as a granulate and processed to shoulder rods on an injection molding machine of the BOY 22A type. The setting of the machine, such as temperature profile on the extruder, injection pressure, clamping force etc. was kept identical for all 3 samples. Using gel permeation chromatography (GPC), the number-average (Mn) and the weight-average (Mw) of the molar masses and the polydispersity (PD) of the starting materials and the injection-molded rods were measured. The method is described in more detail in the appendix.

| Sample | Mn | Mw | PD |
|---|---|---|---|
| PLLA, granules | 80 000 | 220 000 | 2.7 |
| PLLA, rods | 74 000 | 170 000 | 2.3 |
| PDLLA, granules | 130 000 | 270 000 | 2.1 |
| PDLLA, rods | 85 000 | 200 000 | 2.3 |
| Mixture, granules | 100 000 | 230 000 | 2.3 |
| Mixture, rods | 100 000 | 190 000 | 1.9 |

By means of differential thermoanalysis (DSC), the melting point and heat of fusion of the granules and rods were measured. The values measured in the first heating of the sample were used.

| Sample | Melting temp. [° C.] | Heat of fusion [J/g] | Degree of crystallinity [%] |
|---|---|---|---|
| PLLA, Gran. | 157.6 | 38.4 | 42.2 |
| PLLA, rods | 157.6 | 33.9 | 37.3 |
| PDLLA, Gran. | (52.4) | 0 | 0 |
| PDLLA, rods | (52.4) | 0 | 0 |
| Mixture, Gran. | 161.2 | 33.4 | 36.7 |
| Mixture, rods | 161.2 | 33.5 | 36.8 |

PDLLA shows as expected only a glass transition temperature (in parentheses) and no melting process. PLLA and the mixture are as granules and in the processed state (rod) very similar with respect to melting temperature and heat of fusion.

The thermal stability of the shoulder rods was determined with a three-point flex test by means of the outer fiber stress. Based on the standard for measuring the HDT-B value, a bending stress of 0.45 N/mm² was applied and the temperature increased at 2K/min starting from room temperature. The temperature at which an outer fiber stress of 0.2% is achieved is the so-called HDT-B value.

| Sample | HDT-B [° C.] |
|---|---|
| PLLA, rod | 49 |
| PDLLA, rod | 40 |
| Mixture, rod | 48 |

The thermal stability of the mixture is therefore slightly lower than that of the PLLA, whereas the thermal stability of the PDLLA is distinctly lower.

Example 5: Mechanical Properties

The rods were tested in a tensile test on a universal test machine 1445 from Zwick. A 10 kN load sensor was used. The clamping length was 100 mm, the test speed 50 mm/min. A pretensioning of 0.1 MPa was set. Table 1 shows the results of strength, elongation and modulus of elasticity. They are mean values of 2 to 5 individual experiments.

TABLE 1

| Sample | Time [Days] | Strength [MPa] | Elongation [%] | Modulus [GPa] |
|---|---|---|---|---|
| PLLA | 0 | 69.9 | 5.4 | 2.9 |
| PDLLA | 0 | 48.4 | 3.9 | 2.9 |
| Mixture | 0 | 70.9 | 5.5 | 2.9 |

Whereas in PDLLA strength and elongation are significantly reduced, there are no significant differences between PLLA and the mixture. The admixing of 12% PDLLA into PLLA therefore has no effect on strength and elongation of the PLLA.

In addition to the tensile tests, bending impact tests were carried out at room temperature and at −18° C. A pendulum impact tester from W. Ohst was used with a hammer with a working capacity of 4 J. Samples, which were tested at −18° C., were conditioned overnight in a freezer at this temperature. The results are shown in Table 2.

TABLE 2

| Sample | Temperature | Charpy unnotched [kJ/m²] | Standard dev. |
|---|---|---|---|
| PLLA | Room temp. | 31.1 | 8.0 |
| PDLLA | Room temp. | 18.0 | 7.0 |
| Mixture | Room temp. | 28.1 | 4.0 |
| PLLA | −18° C. | 27.1 | 5.0 |
| PDLLA | −18° C. | 15.0 | 2.8 |
| Mixture | −18° C. | 26.1 | 4.8 |

Example 6: Influence on the Resistance to Hydrolysis

Injection-molded shoulder rods of PLLA, PDLLA and a mixture of PLLA and 12% PDLLA as in example 2 were stored in a climatic chamber KPK 400 from Feutron at 40° C. and 90% relative humidity. Every 10 days samples of each PLA type were withdrawn and investigated in the tensile test on a universal testing machine 1445 from Zwick. The results are included in Table 3.

TABLE 3

| Sample | Time [Days] | Strength [MPa] | Elongation [%] | Modulus [GPa] |
|---|---|---|---|---|
| PLLA | 0 | 69.9 | 5.4 | 2.9 |
| PDLA | 0 | 48.4 | 3.9 | 2.9 |
| Mixture | 0 | 70.9 | 5.5 | 2.9 |
| PLLA | 10 | 61.1 | 4.1 | 2.7 |
| PDLA | 10 | 6.4 | 3.0 | 1.0 |
| Mixture | 10 | 62.5 | 4.8 | 2.6 |
| PLLA | 21 | 61.5 | 3.9 | 2.8 |
| PDLA | 21 | — | — | — |
| Mixture | 21 | 61.3 | 5.6 | 2.7 |
| PLLA | 31 | 58.9 | 3.3 | 2.8 |
| PDLA | 31 | — | — | — |
| Mixture | 31 | 61.3 | 5.1 | 2.8 |
| PLLA | 42 | 59.8 | 3.1 | 2.6 |

TABLE 3-continued

| Sample | Time [Days] | Strength [MPa] | Elongation [%] | Modulus [GPa] |
|---|---|---|---|---|
| PDLA | 42 | — | — | — |
| Mixture | 42 | 62.9 | 4.0 | 2.6 |

Note:
— not measurable

PLLA and the mixture do not differ in strength and elongation in terms of the measurement precision. This applies to all time points in the measurement scheme. Therefore, the mixture is proven to be just as hydrolysis resistant as PLLA. In contrast, PDLLA shows even after 10 days storage a severe property loss and, on even longer storage, deliquescence of the rods with properties no longer evaluable.

What is claimed is:

1. A process for preparing a crystallizable polylactic acid mixture, the process comprising:
    polycondensing lactic acid to yield an oligomer;
    depolymerizing the oligomer to yield a crude lactide;
    purifying the crude lactide to yield a pure lactide, wherein a simultaneous separation is carried out into an L-lactide-rich fraction having a content of at most 6% by weight D-lactic acid units and a meso-lactide-rich fraction having a content of at least 15% by weight meso-lactide or into a D-lactide-rich fraction having a content of at most 6% by weight L-lactic acid units and a meso-lactide-rich fraction having a content of at least 15% by weight meso-lactide;
    performing a separate ring-opening polymerization out of the meso-lactide-rich fraction to give a meso-lactide-rich polylactic acid molding composition (PDLLA) and of the L-lactide-rich or of the D-lactide-rich fraction to give an L-lactide-rich polylactic acid molding composition (PLLA) or to give a D-lactide-rich polylactic acid molding composition (PDLA) respectively; and
    generating the polylactic acid mixture (PLA) by mixing 1 to 17 parts by weight of the meso-lactide-rich polylactic acid molding composition (PDLLA) and at least a portion of the L-lactide-rich polylactic acid molding composition (PLLA) or at least a portion of the D-lactide-rich polylactic acid molding composition (PDLA);
    wherein the molar yield of the polylactic acid mixture is greater than 90%.

2. The process of claim 1 wherein the mixing is carried out so that
    in a case where the meso-lactide-rich polylactic acid molding composition (PDLLA) and the L-lactide-rich polylactic acid molding composition (PLLA) are mixed, an average content of D-lactic acid units in a resultant polylactic acid mixture (PLA) is between 6 and 30% by weight; and
    in a case where the meso-lactide-rich polylactic acid molding composition (PDLLA) and the D-lactide-rich polylactic acid molding composition (PDLA) are mixed, an average content of L-lactic acid units in a resultant polylactic acid mixture (PLA) is between 6 and 30% by weight.

3. The process of claim 1 comprising at least one of the following:
    the L-lactide-rich fraction is purified to a content of 0 to 6% by weight of D-lactic acid units and/or the L-lactide-rich polylactide molding composition (PLLA) generated therefrom has a content of 0 to 6% by weight of D-lactic acid units;
    the D-lactide-rich fraction is purified to a content of 0 to 6% by weight of L-lactic acid units and/or the D-lactide-rich polylactide molding composition (PDLA) generated therefrom has a content of 0 to 6% by weight of L-lactic acid units; or
    the meso-lactide-rich fraction is purified to a content of 15 to 100% by weight and/or the mesolactide-rich polylactic acid molding composition (PDLLA) generated therefrom has a content derived from meso-lactide units of 15 to 100% by weight.

4. The process of claim 1 comprising at least one of:
    the L-lactide-rich fraction is purified to a content of 94 to 100% by weight of L-lactic acid units and/or the L-lactide-rich polylactide molding composition (PLLA) generated therefrom has a content of 94 to 100% by weight of L-lactic acid units; or
    the D-lactide-rich fraction is purified to a content of 94 to 100% by weight D-lactic acid units and/or the D-lactide-rich polylactide molding composition (PLLA) generated therefrom has a content of 94 to 100% by weight of D-lactic acid units.

5. The process of claim 1 wherein purifying the crude lactide comprises at least one of:
    purifying the meso-lactide-rich fraction to a carboxyl group content of at most 20 mmol/kg; or
    purifying the L-lactide-rich fraction or the D-lactide-rich fraction to a carboxyl group content of at most 10 mmol/kg.

6. The process of claim 1 comprising at least one of:
    in the ring-opening polymerization of the meso-lactide-rich fraction, generating a meso-lactide-rich polylactic acid molding composition (PDLLA) having an intrinsic viscosity of 0.80 to 1.80; or
    in the ring-opening polymerization of the L-lactide-rich or of the D-lactide-rich fraction, generating an L-lactide-rich polylactic acid molding composition (PLLA) or a D-lactide-rich polylactic acid molding composition (PDLA) having an intrinsic viscosity of 1.0 to 2.0.

7. The process of claim 1 further comprising performing at least one of the following steps before, during, and/or after the mixing of the meso-lactide-rich polylactic acid molding composition (PDLLA) and the L-lactide-rich polylactic acid molding composition (PLLA) or the D-lactide-rich polylactic acid molding composition (PDLA):
    adding stabilizers and/or additives;
    demonomerizing;
    cooling and/or granulating; or
    crystallizing, drying, and cooling in a tower dryer having a stirred crystallization zone, a drying zone, and a tube bundle condenser.

8. The process of claim 1 wherein the lactic acid used has an isomeric purity of at least 95%.

9. The process of claim 1 further comprising performing at least one of the following steps to at least a portion of the meso-lactide-rich polylactic acid molding composition (PDLLA) and at least a portion of the L-lactide-rich polylactic acid molding composition (PLLA) or the D-lactide-rich polylactic acid molding composition (PDLA), directly after the separate preparation thereof by the ring-opening polymerization:
    stabilizing and mixing together in a molten state;
    separately stabilizing and demonomerizing and subsequently mixing in a molten state; or
    separately granulating and mixing to yield a granulate mixture.

10. The process of claim 9 further comprising processing directly a mixture generated in the molten state or processing directly or separately the granulate mixture, wherein the processing yields moldings comprising fibers, films, and/or shaped articles.

11. The process of claim 1 wherein a molar yield of the polylactic acid mixture (PLA) is at least 95%, based on the lactic acid used.

\* \* \* \* \*